United States Patent [19]

Pinson

[11] Patent Number: 4,952,042

[45] Date of Patent: Aug. 28, 1990

[54] MISSILE SEEKER HEAD

[75] Inventor: George T. Pinson, Huntsville, Ala.

[73] Assignee: The Boeing Company, Seattle, Wash.

[21] Appl. No.: 367,258

[22] Filed: Jun. 16, 1989

[51] Int. Cl.[5] .................. G02B 23/16; G02B 6/06
[52] U.S. Cl. .................. 350/567; 350/96.25; 244/3.16
[58] Field of Search .............. 350/500, 96.23, 96.24, 350/96.25, 537, 567, 568; 244/3.16

[56] References Cited

U.S. PATENT DOCUMENTS

| | | | |
|---|---|---|---|
| 3,389,950 | 6/1968 | Harper | 350/96.25 |
| 4,054,364 | 10/1977 | Webster | 350/96.2 |
| 4,087,061 | 5/1978 | Burt | 244/3.16 |
| 4,152,724 | 5/1979 | Hunter | 358/109 |
| 4,266,173 | 5/1981 | McTigue et al. | 318/585 |

FOREIGN PATENT DOCUMENTS

| | | | |
|---|---|---|---|
| 0100124 | 2/1984 | European Pat. Off. | 244/3.16 |
| 2929971 | 2/1981 | Fed. Rep. of Germany | 350/96.25 |
| 1412771 | 11/1975 | United Kingdom | 350/96.25 |
| 1455119 | 11/1976 | United Kingdom | 244/3.16 |

Primary Examiner—Rodney B. Bovernick
Assistant Examiner—Ronald M. Kachmarik
Attorney, Agent, or Firm—Finnegan, Henderson, Farabow, Garrett & Dunner

[57] ABSTRACT

A missile seeker head comprises a telescope mounted on a gimbal apparatus in a forward end of a projectile, pivotal in the gimbal sufficient to search a field of regard of up to 60°, and a camera mounted further back in the projectile, connected to the telescope by a coherent fiber optic bundle.

10 Claims, 5 Drawing Sheets

MISSILE SEEKER HEAD

BACKGROUND OF THE INVENTION

1. Field of the Invention

The present invention relates to a seeker head for a missile and more particularly to a stabilized seeker head using a fiber optic image relay having a wide field of regard.

2. Description of the Related Art

Missiles, projectiles, aircraft and the like that use imaging seekers normally mount a camera in a gimbal system in a forward portion of an air frame or missile casing, in order to obtain a wide field of regard for the camera optics. A common seeker head used in the prior art, comprising a camera mounted on a gimbal system, is shown in FIG. 1.

As shown in FIG. 1, a conventional seeker head 10 includes a cylindrical casing 11, having a centerline axis and a predetermined diameter, with a domed portion 12 at a forward end. Behind the domed portion and enclosed by the casing is a camera assembly 13, mounted on a gimbal assembly 14, including pitch and yaw torque motors, 15 and 16 respectively. The camera assembly 13 also comprises detector elements, associated camera electronics, and a protective case, mounted on the gimbal with the camera assembly, but not separately shown in FIG. 1. For some cameras, such as infrared imaging cameras, refrigeration devices may also be required.

Several drawbacks are associated with the conventional seeker head. The size of the camera assembly 13 limits seeker head performance. The physical dimensions of the camera assembly 13, relative to the casing 11, results in a field of regard restricted by the dimensions of the casing. The restricted field of regard, one half of which is shown as $\theta_1$ for the camera assembly enables the conventional seeker head to see only up to 10° on either side of the centerline axis as shown in FIG. 1.

Further, in order to stabilize the conventional seeker head of FIG. 1, it is necessary to balance the system in both the pitch and yaw reference planes. This generally requires use of inert counterweights 17 on the camera. The increased weight associated with the counterweights requires corresponding increases in power and size of the torque motors, 15 and 16, in order to maintain the desired frequency response of the seeker head.

Further, the larger torque motors, 15 and 16, place a larger drain on an available missile power supply (not shown).

The present invention improves on known seeker heads by providing a missile seeker head having a wide field of regard and rapid optical response for improved target searching and target tracking. The invention also provides a missile seeker head having reduced weight, thereby requiring smaller torque motors, thus reducing the power load on a missile electrical system.

Additional advantages of the invention will be set forth in the description which follows, and in part will be obvious from the description, or may be learned by practice of the invention. The advantages of the invention may be realized and obtained by means of the instrumentalities and combinations particularly pointed out in the appended claims.

SUMMARY OF THE INVENTION

In accordance with the purposes of the invention as embodied and broadly described herein, a missile seeker head for operative disposition proximate an optically transmissive dome fixed to one axial end of an elongated, cylindrical casing having a diameter and a centerline axis is provided, comprising a gimbal mounting assembly fixed in the casing proximate the dome for selective movement about axes orthogonal to the centerline axis, a telescope having a line of sight axis, including optical elements disposed for receiving optical signals through a first end and for focusing the optical signals along the line of sight axis onto a focal plane proximate a second axially-opposed end thereof, the telescope having an axial length less than the diameter of the casing and being supported between the opposed ends by the gimbal mounting assembly for movement therewith to selectively direct the first end through a field of regard, a camera fixed in the casing in axially spaced relation to the gimbal mounting assembly, the camera including an optical input element, and a coherent optical fiber bundle including a plurality of individual fibers each having opposed input and output ends and a length greater than the axial spacing between the gimbal mounting assembly and the camera, the input ends of the fibers being fixed to the telescope at the focal plane in symmetrical relation to the optical axis for receiving the focused optical signals and the output ends of the fibers being fixed to the optical input element for conveying the focused optical signal to the camera, the fibers between the input and output ends being symmetrically disposed around the centerline axis and being free to move with respect to each other.

It is preferable that the field of regard of the telescope be limited only by the length of the optical fibers.

It is further preferable that the field of regard be generally conical in shape having a vertex of approximately 60°.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention, an example of which is illustrated in the accompanying drawings.

The invention is a missile seeker head for operative disposition proximate an optically transmissive dome fixed to one axial end of an elongated substantially cylindrical casing, having a diameter and a centerline axis.

Figure 1:
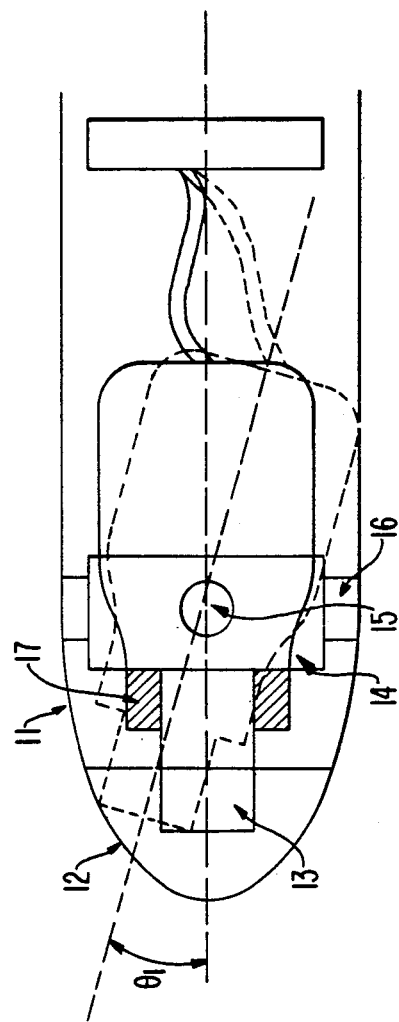
FIG. 1 is a longitudinal sectional view of a prior art stabilized seeker head depicting $\theta_1$, which is one half of a conventional field of regard.
Figure 2:
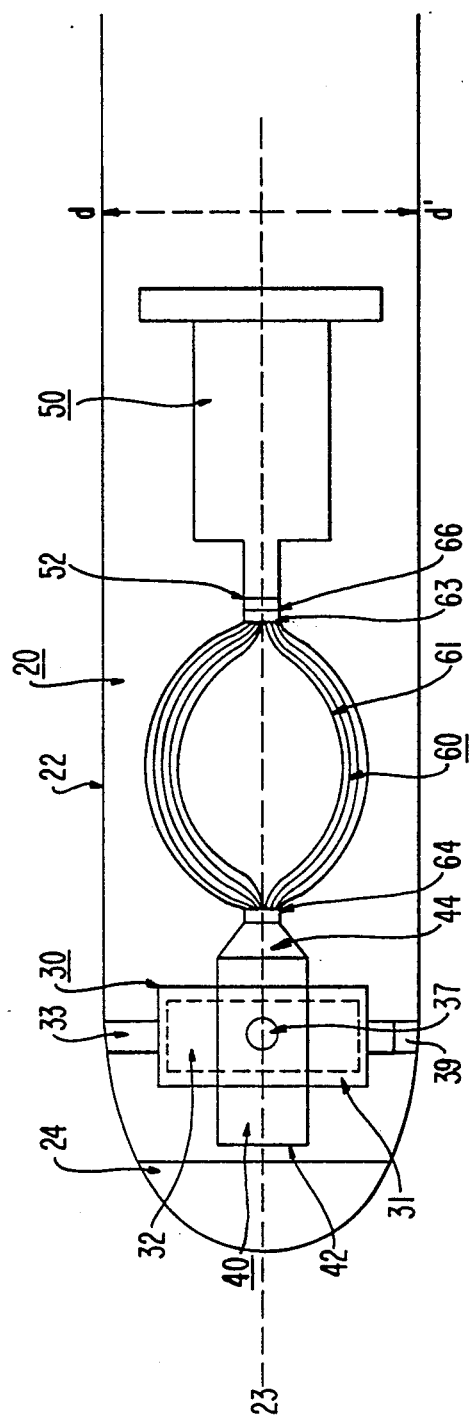
FIG. 2 is a longitudinal sectional view of a missile seeker head incorporating the teachings of the present invention.

As depicted in FIG. 2, the missile seeker head generally referred to as 20, is enclosed in a substantially cylindrical casing 22, having a predetermined diameter represented by arrows d—d', and a centerline axis 23 extending along its length. An optically transmissive, arcuate domed portion 24 is mounted at a forward axial end of casing 22. Domed portion 24 functions to protect missile seeker head components from damage during missile flight. Domed portion 24 further functions to pass visual light and infrared energy signals.

Figure 4:
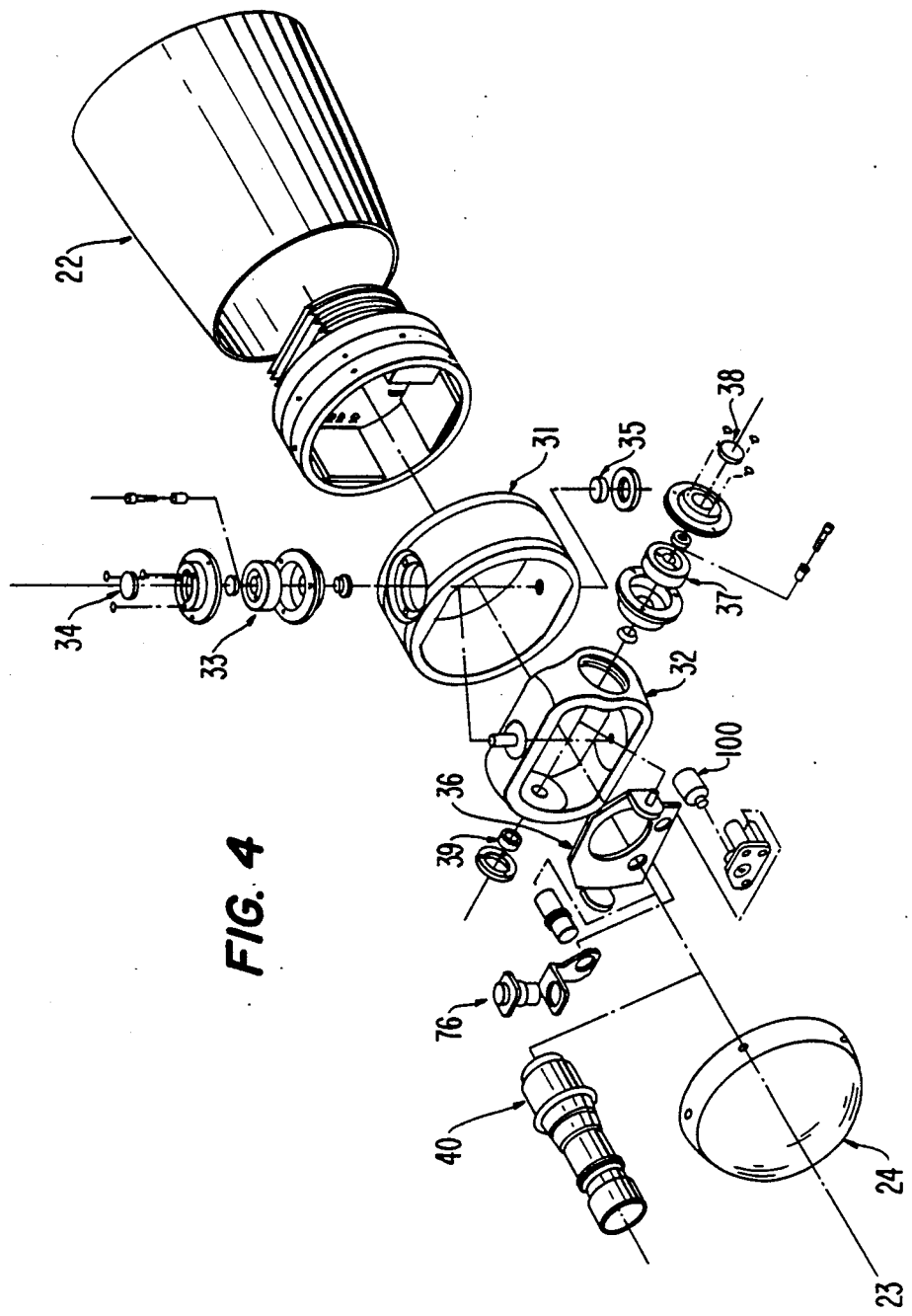
FIG. 4 is an exploded perspective view depicting a preferred assembly of selected parts of a missile seeker head shown in FIG. 2.

In accordance with the invention, the seeker head comprises a gimbal mounting assembly fixed in the casing proximate the dome for selective movement about axes orthogonal to the centerline axis. As embodied herein, a gimbal mounting assembly, generally referred to as 30, is mounted on centerline axis 23 of casing 22, adjacent domed portion 24. Referring to FIG. 4, gimbal mounting assembly 30 includes a generally annular-shaped yaw gimbal 31, rigidly mounted to casing 22. A pitch gimbal 32 is preferably pivotally mounted within and supported by yaw gimbal 31 for reciprocal rotation about one orthogonal axis. Yaw gimbal 31 is mounted with a yaw torque motor assembly 33, a yaw position potentiometer 39 for measuring the angle of yaw rotation from the centerline axis, and a first support bearing 35. There is further provided a support bracket 36 mounted within and supported by pitch gimbal 32, for reciprocal rotation about the other orthogonal axis. Support bracket 36 is mounted with a pitch torque motor assembly 37, a pitch position potentiometer 38, and a second support bearing 39. Rate sensor assembly 76 and telescope zoom drive 100 are mounted on bracket 36.

Figure 3:
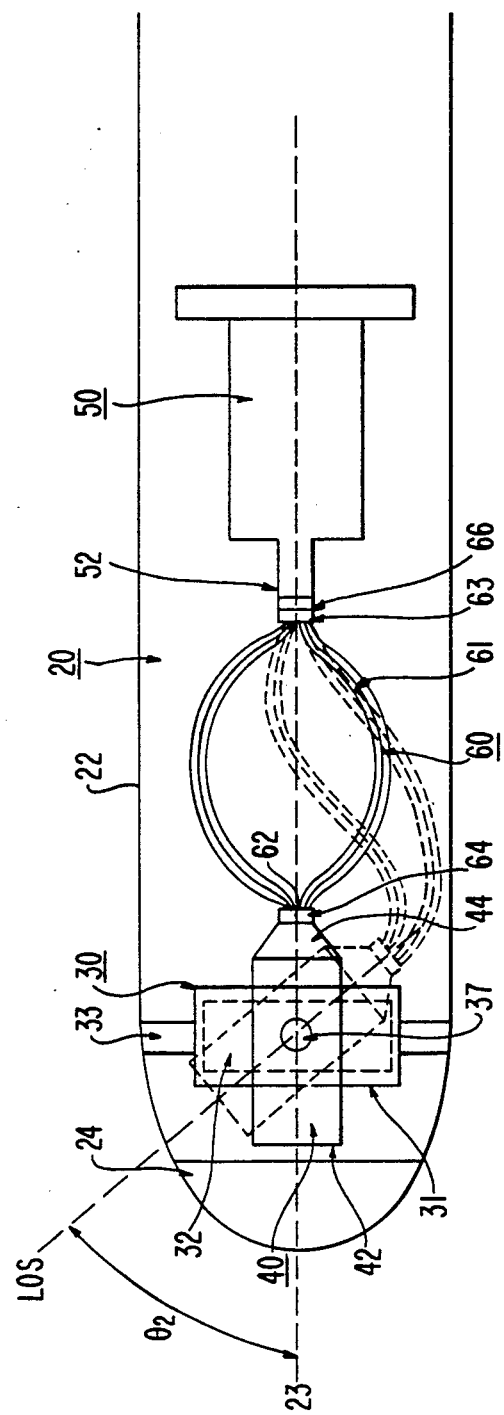
FIG. 3 is a longitudinal sectional view of a missile seeker head of FIG. 2, depicting $\theta_2$, which is one half of the wider field of regard obtainable with the present invention.

The invention further includes a telescope having a line of sight axis including optical elements disposed for receiving optical signals through a first end and for focusing said optical signals along said line of sight axis onto a focal plane proximate a second axially-opposed end thereof, said telescope having an axial length less than the diameter of said casing and being supported between said opposed ends by said gimbal mounting assembly for movement therewith to selectively direct said first end through a field of regard. As embodied herein, and referring to FIG. 3, a telescope 40, mounted in the aperture of support bracket 36, is substantially cylindrical, having a first end 42, facing in a general direction of domed portion 24. First end 42 includes an optical element, functioning to receive visual light or infrared energy signals passing through domed portion 24, focusing the signals along the line of sight axis onto a focal plane proximate an axially-opposed second end 44. Telescope 40 has an axial length less than diameter d—d' at casing 22. It is mounted in gimbal 30 for movement therewith to selectively direct first end 42 through a field of regard which is twice angle $\theta_2$ The seeker head of the invention further comprises a camera fixed in the casing in spaced relation to the gimbal mounting assembly, the camera including an optical input element. As embodied herein, a camera, generally referred to as 50, is rigidly mounted within casing 22 rearward of telescope 40. Camera 50 includes an optical input element 52 aligned with centerline axis 23 for receiving the signals transmitted from telescope 40.

In accordance with the present invention, there is provided a coherent optical fiber bundle including a plurality of individual fibers each having opposed input and output ends and a length greater than the axial spacing between said gimbal mounting assembly and said camera, the input ends of said fibers being fixed to said optical input element for conveying said focused optical signals to said camera, said fibers between said input and output ends being symmetrically disposed around said centerline axis and being free to move with respect to each other. As here embodied, a coherent optical fiber bundle 60 connects telescope means 40 and camera means 50. Optical fiber bundle 60 comprises a plurality of individual optical fibers 61, loosely bundled together. Each fiber 61 extends between a polished input face 62 and a polished output face 63, generally along centerline axis 23. Input face 62 is securely attached to second end 44 of telescope means 40 with a bracket 64. Output face 63 is fixed to a camera/optical fiber interface 66, which is in turn attached to optical input element 52 of camera 50. Fibers 61 have an axial length greater than the distance between gimbal assembly 30 and camera 50.

Figure 5:
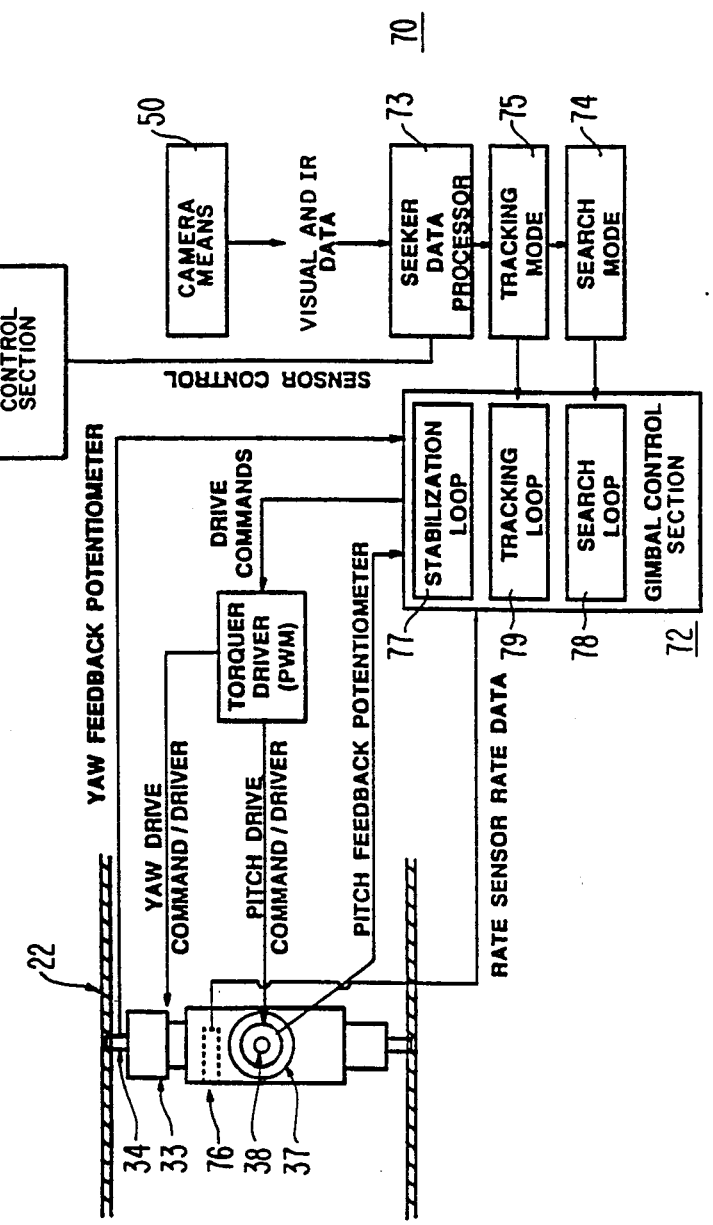
FIG. 5 is a functional block diagram depicting a control means for controlling an operation of a missile seeker head as embodied herein.

Preferably the seeker head includes control means for processing input data and outputting control signals. As embodied herein, referring to FIG. 5, control means 70 functions to receive visual and infrared signals from camera 50, and process command signals to drive the pitch and yaw torque motors, 33 and 37 of gimbal mounting assembly 30, thus directing motion of telescope 40 to receive optical signals within the field of regard.

Visual light and infrared energy signals pass through domed portion 24 of casing 22, in order to be received by telescope 40. In accordance with the invention, referring to FIG. 3, telescope means 40, due to its small dimensions relative to the dimensions of the surrounding casing 22, is free to pivot on gimbal mounting assembly 30 within a set of axes orthogonal to centerline axis 23, defined by a generally conical pattern swept by the line of sight axis, having a vertex angle of up to 60°, which is twice $\theta_2$.

An exact image of the visual light and infrared signals received by telescope 40 is transmitted by optical fiber bundle 60 to camera 50, where the images are recorded and can be transmitted to control means 70, which function to provide drive signals back to gimbal mounting assembly 30 to direct movement of telescope 40 within the field of regard.

The field of regard is limited only by the limits of fiber optic bundle 60, rather than the dimensions of the camera within casing 22 as in the prior art.

Further, the small size of telescope 40 requires use of corresponding smaller yaw torque motor assembly 33 and pitch torque motor assembly 37, thus reducing the power drain on the missile.

Further, the relative speed and ease with which smaller telescope 40 can pivot provides for rapid optical response.

Further, the requirement for balancing weights is eliminated, again reducing the overall weight of the missile seeker head.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the applicant's general inventive concept.

What is claimed is:

1. A missile seeker head for operative disposition proximate an optically transmissive dome fixed to one axial end of an elongated, cylindrical casing having a diameter and a centerline axis, said seeker head comprising:

a gimbal mounting assembly fixed in said casing proximate said dome for selective movement about axes orthogonal to said centerline axis;

a telescope having a line of sight axis including optical elements disposed for receiving optical signals through a first end and for focusing said optical signals along said line of sight axis onto a focal plane proximate a second axially-opposed end thereof, said telescope having an axial length less than the diameter of said casing and being supported between said opposed ends of said gimbal mounting assembly for movement therewith to selectively direct said first end through a field of regard;

a camera fixed in said casing in coaxially spaced relation to said gimbal mounting assembly, said camera including an optical input element; and a coherent optical fiber bundle including a plurality of individual fibers each having opposed input and output ends and a length greater than the axial spacing between said gimbal mounting assembly and said camera, the input ends of said fibers being fixed to said telescope at the focal plane for receiving said optical signals, and the output ends of said fibers being fixed to said optical input element for conveying said focused optical signals to said camera, said fibers between said input and output ends being symmetrically disposed around said centerline axis and being free to move with respect to each other.

2. The missile seeker head of claim 1 further including control means for driving said gimbal mounting assembly to selectively direct said telescope to receive the optical signals within said field of regard.

3. The missile seeker head of claim 1, wherein the field of regard of said telescope is limited by the length of said optical fibers.

4. The missile seeker head of claim 3, wherein the field of regard is generally conical in shape having a vertex angle of approximately 60°.

5. A missile seeker head for operative disposition proximate an optically transmissive dome fixed to one axial end of an elongated, cylindrical casing having a diameter and a centerline axis, said seeker head comprising:

a gimbal mounting assembly fixed in said casing proximate said dome for selective movement about axes orthogonal to said centerline axis;

a telescope having a line of sight axis including optical elements disposed for receiving optical signals through a first end and for focusing said optical signals along said line of sight axis onto a focal plane proximate a second axially-opposed end thereof, said telescope having an axial length less than the diameter of said casing and being supported at a point midway between said opposed ends by said gimbal mounting assembly for movement therewith to selectively direct said first end through a field of regard;

a camera fixed in said casing in coaxially spaced relation to said gimbal mounting assembly, said camera including an optical input element; and a coherent optical fiber bundle including a plurality of individual fibers each having opposed input and output ends and a length greater than the axial spacing between said gimbal mounting assembly and said camera, the input ends of said fibers being fixed to said telescope at the focal plane for receiving said optical signals, and the output ends of said fibers being fixed to said optical input element for conveying said focused optical signals to said camera, said fibers between said input and output ends being symmetrically disposed around said centerline axis and being free to move with respect to each other.

6. The missile seeker head of claim 5 further including control means for driving said gimbal mounting assembly to selectively direct said telescope to receive the optical signals within said field of regard.

7. The missile seeker head of claim 5, wherein the field of regard of said telescope is limited by the length of said optical fibers.

8. The missile seeker head of claim 7, wherein the field of regard is generally conical in shape having a vertex angle of approximately 60°.

9. A missile seeker head for operative disposition proximate an optically transmissive dome fixed to one axial end of an elongated, cylindrical casing having a diameter and a centerline axis, said seeker head comprising:

a gimbal mounting assembly fixed in said casing proximate said dome for selective movement about axes orthogonal to said centerline axis;

a telescope having a line of sight axis including optical elements disposed for receiving optical signals through a first end and for focusing said optical signals along said line of sight axis onto a focal plane proximate a second axially-opposed end thereof, said telescope having an axial length less than the diameter of said casing and being supported between said opposed ends by said gimbal mounting assembly for movement therewith to selectively direct said first end through a field of regard;

a camera fixed in said casing in coaxially spaced relation to said gimbal mounting assembly, said camera including an optical input element; and a coherent optical fiber bundle including a plurality of individual fibers each having opposed input and output ends and a length greater than said axial spacing between said gimbal mounting assembly and said camera, wherein the field of regard of said telescope is limited by said length of said optical fibers, the input ends of said fibers being fixed to said telescope at the focal plane for receiving said optical signals, and the output ends of said fibers being fixed to said optical input element for conveying said focused optical signals to said camera, said fibers between said input and output ends being symmetrically disposed around said centerline axis and being free to move with respect to each other.

10. The missile seeker head of claim 9, wherein the field of regard is generally conical in shape having a vertex angle of approximately 60°.

* * * * *